(12) United States Patent
Sagara

(10) Patent No.: US 10,562,104 B2
(45) Date of Patent: Feb. 18, 2020

(54) CUTTING TOOL

(71) Applicant: TUNGALOY CORPORATION, Fukushima (JP)

(72) Inventor: Katsuhiro Sagara, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 24 days.

(21) Appl. No.: 16/112,914

(22) Filed: Aug. 27, 2018

(65) Prior Publication Data
US 2019/0061015 A1 Feb. 28, 2019

(30) Foreign Application Priority Data

Aug. 30, 2017 (JP) ................................ 2017-165288
Jun. 27, 2018 (JP) ................................ 2018-121623

(51) Int. Cl.
*B23B 27/04* (2006.01)
*B23B 27/16* (2006.01)
(Continued)

(52) U.S. Cl.
CPC .......... *B23B 27/1607* (2013.01); *B23B 27/02* (2013.01); *B23B 27/045* (2013.01); *B23B 27/141* (2013.01); *B23B 29/043* (2013.01); *B23B 2200/0423* (2013.01); *B23B 2200/081* (2013.01); *B23B 2200/161* (2013.01); *B23B 2200/245* (2013.01); *B23B 2200/369* (2013.01); *B23B 2220/12* (2013.01); *B23B 2228/105* (2013.01)

(58) Field of Classification Search
CPC ............ B23B 2200/0423; B23B 27/02; B23B 27/141; B23B 27/1607; B23B 29/04; B23B 2228/105; B23B 29/043; B23B 2200/242; B23B 2200/3609; B23B 27/045; B23B 27/04; B23B 27/1611; B23B 27/1622
USPC ........................................................ 428/212
See application file for complete search history.

(56) References Cited

U.S. PATENT DOCUMENTS 4,778,311 A * 10/1988 Niemi ................... B23B 27/045
407/116
5,135,336 A * 8/1992 Noguchi ............... B23B 27/045
407/117
(Continued)

FOREIGN PATENT DOCUMENTS

EP 0127416 A 12/1984
EP 1911538 A1 4/2008
(Continued)

*Primary Examiner* — Sara Addisu
(74) *Attorney, Agent, or Firm* — Studebaker & Brackett PC

(57) ABSTRACT

Provided is a cutting tool in which one end side of a protruding cutting edge is sharpened while wear resistance is improved. The cutting tool of the present invention includes an end surface, a peripheral side surface that intersects the end surface, and a cutting edge in an intersecting ridgeline portion between the end surface and the peripheral side surface. When first and second points (A and B) are set on the cutting edge, the first point (A) protrudes further toward an outer side of the cutting tool than the second point (B). The cutting tool has a coating film on its surface. The cutting edge has a portion in which the thickness of the coating film gradually increases toward the second point (B) from the first point (A).

12 Claims, 13 Drawing Sheets

(51) Int. Cl.
 *B23B 27/02* (2006.01)
 *B23B 29/04* (2006.01)
 *B23B 27/14* (2006.01)

(56) References Cited

U.S. PATENT DOCUMENTS

| | | | | |
|---|---|---|---|---|
| 5,137,396 A * | 8/1992 | Durschinger | ......... | B23B 27/045 407/116 |
| 5,511,911 A * | 4/1996 | Katbi | ............. | B23B 27/045 407/114 |
| 5,725,334 A * | 3/1998 | Paya | ............. | B23B 27/045 407/104 |
| 5,758,994 A * | 6/1998 | Hintze | ............ | B23B 27/141 407/113 |
| 5,921,722 A * | 7/1999 | Paya | ............. | B23B 27/143 407/113 |
| 6,146,064 A * | 11/2000 | Flolo | ............. | B23B 27/045 407/114 |
| 7,665,933 B2 * | 2/2010 | Nagaya | ............ | B23B 27/045 407/114 |
| 7,883,300 B1 * | 2/2011 | Simpson, III | ........ | B23B 27/045 407/113 |
| 2001/0014259 A1 * | 8/2001 | Inayama | ........... | B23B 27/045 407/116 |
| 2004/0101374 A1 * | 5/2004 | Ejderklint | .......... | B23B 27/045 407/114 |
| 2006/0269367 A1 * | 11/2006 | Havrda | ............ | B23B 27/045 407/117 |
| 2010/0067992 A1 * | 3/2010 | Uchijo | ............. | B23B 27/007 407/100 |
| 2010/0119314 A1 * | 5/2010 | Nagaya | ............ | B23B 27/04 407/113 |
| 2014/0286718 A1 * | 9/2014 | Scherman | ......... | B23B 27/143 407/114 |
| 2015/0056029 A1 * | 2/2015 | Shimamoto | ........ | B23B 27/045 407/115 |

FOREIGN PATENT DOCUMENTS

| | | |
|---|---|---|
| JP | 2006-502874 A | 1/2006 |
| JP | 2010-228016 A | 10/2010 |
| JP | 2011-110654 A | 6/2011 |
| JP | 2011-167805 A | 9/2011 |
| JP | 2011167805 A * | 9/2011 |
| WO | 2004/035257 A2 | 4/2004 |

* cited by examiner

CUTTING TOOL

BACKGROUND

Field

The present invention relates to a cutting tool used in cutting.

Description of Related Art

Some cutting tools for cutting are coated with coating layers mainly for increasing tool life. There are cases where the thickness of the coating layer is changed depending on the portion of a cutting edge. For example, in a cutting insert for parting and grooving disclosed in Patent Publication JP-A-2010-228016, the surface of a substrate is coated with a coating layer, and the thickness of the coating layer in a nose cutting edge is made larger than the thickness thereof in a straight cutting edge. Patent Publication JP-A-2010-228016 describes that the diameter of a droplet is controlled by varying the thickness of the coating layer. Further, in order to strengthen the cutting edge, the cutting edge is subjected to honing, and the size of a honing area in the nose cutting edge is made larger than that in the straight cutting edge.

SUMMARY

As in the cutting insert of Patent Publication JP-A-2010-228016, when the thickness of the coating layer in the nose cutting edge is made larger than the thickness thereof in the straight cutting edge, there are cases where the roundness (honing surface) of each of both end portions of the cutting edge is increased, the cutting resistance of the cutting edge at each end portion is increased, and the quality of a finished surface of a workpiece to be machined is degraded in the end. Particularly in the cutting tool in which one end side of the cutting edge protrudes further toward an outer side of the cutting tool than the other end side thereof, there are cases where it is desired to sharpen one end side of the protruding cutting edge while improving wear resistance in order to improve the quality of the finished surface of the workpiece.

A cutting tool of the present invention is a cutting tool including: an end surface; a peripheral side surface intersecting the end surface; and a cutting edge in an intersecting ridgeline portion between the end surface and the peripheral side surface wherein, when first and second points (A and B) are set on the cutting edge, the first point (A) protrudes further toward an outer side of the cutting tool than the second point (B). The cutting tool further includes a coating film on a surface of the cutting tool. The cutting edge has a portion in which a thickness of the coating film gradually increases toward the second point (B) from the first point (A).

In addition, a cutting tool according to the present disclosure is a cutting tool including: an upper surface having a longitudinal direction and a lateral direction perpendicular to the longitudinal direction; a lower surface facing a direction opposite to the upper surface, the lower surface having the longitudinal direction and the lateral direction; a first side surface connected to the upper surface and the lower surface, the first side surface facing the longitudinal direction; a second side surface connected to the upper surface, the lower surface, and the first side surface, the second side surface facing the lateral direction; a third side surface connected to the upper surface, the lower surface, and the second side surface, the third side surface facing the longitudinal direction; a fourth side surface connected to the upper surface, the lower surface, the third side surface, and the first side surface, the fourth side surface facing the lateral direction; a cutting edge formed in a connection portion between the upper surface and the first side surface, the cutting edge inclined relative to the second side surface and the fourth side surface such that a distance from a straight line that passes through the second side surface and the fourth side surface and is parallel to the lateral direction increases toward the fourth side surface from the second side surface in a top view in which the cutting edge is viewed from a direction facing the upper surface; and a coating layer formed on a surface including at least the cutting edge. A thickness of the coating layer formed in the cutting edge gradually increases from a first point closer to the fourth side surface than to the second side surface to a second point closer to the second side surface than to the fourth side surface and spaced apart from the first point by a distance corresponding to not less than half of the cutting edge in the top view.

DETAILED DESCRIPTION

Figure 1:
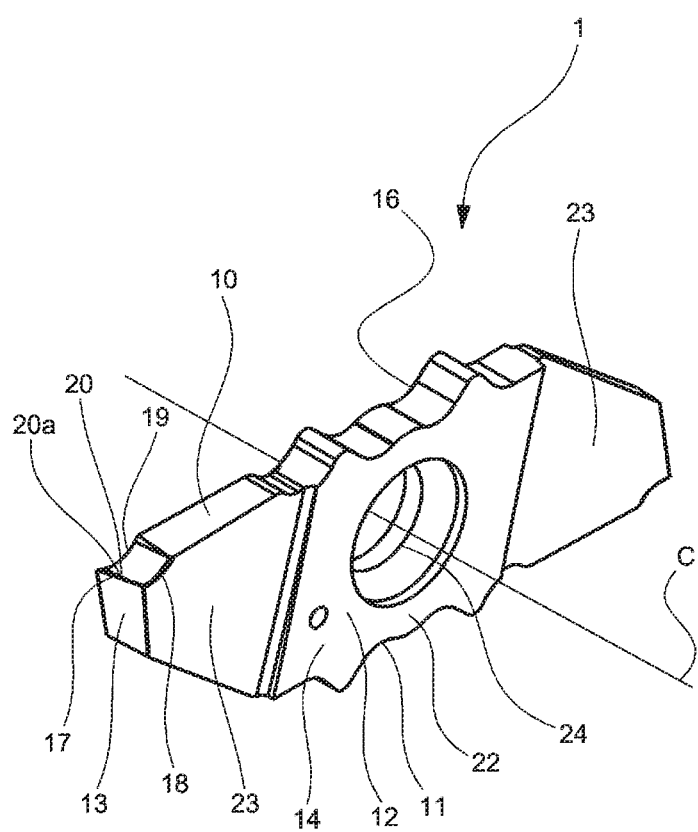
FIG. 1 is a perspective view of a cutting tool (cutting insert) according to a first embodiment of the present invention.
Figure 2:
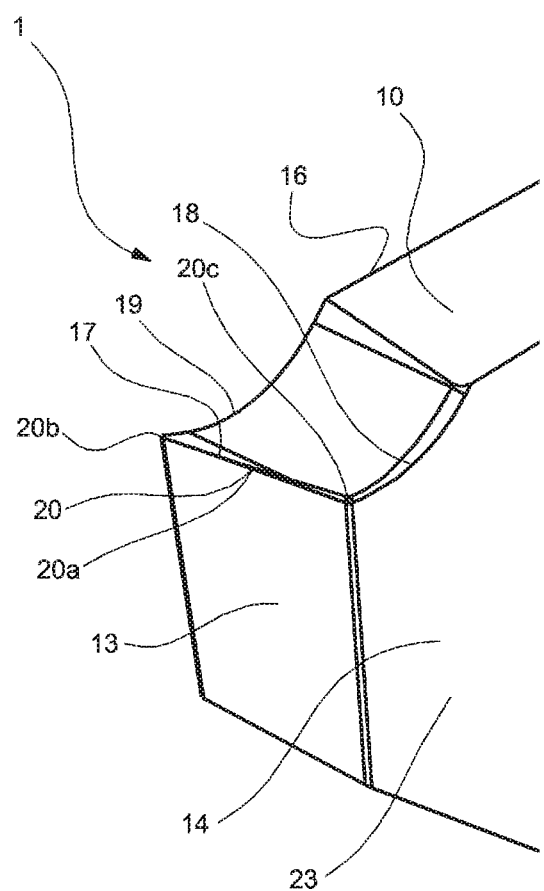
FIG. 2 is a partially enlarged perspective view of the cutting tool of FIG. 1.

Hereinbelow, preferred embodiments of the present invention will be described with reference to the drawings. Note that the same elements are designated by the same reference numerals, and the duplicate description thereof will be omitted. In addition, positional relationships such as up, down, left, and right are based on those shown in the drawings unless otherwise noted. Further, the ratios of dimensions in the drawings are not limited to those shown in the drawings. Furthermore, the following embodiments are examples for describing the present invention, and the present invention is not limited to the embodiments.

FIG. 1 is a perspective view showing a cutting tool 1 according to an embodiment of the present invention. Herein, a cutting insert is referred to as the cutting tool 1. However, the cutting insert and a holder 2 (FIG. 9) to which the cutting insert is detachably attached may be collectively referred to as the cutting tool 1. In the following description, the cutting insert is referred to as the cutting tool 1 only as an example.

Figure 6:
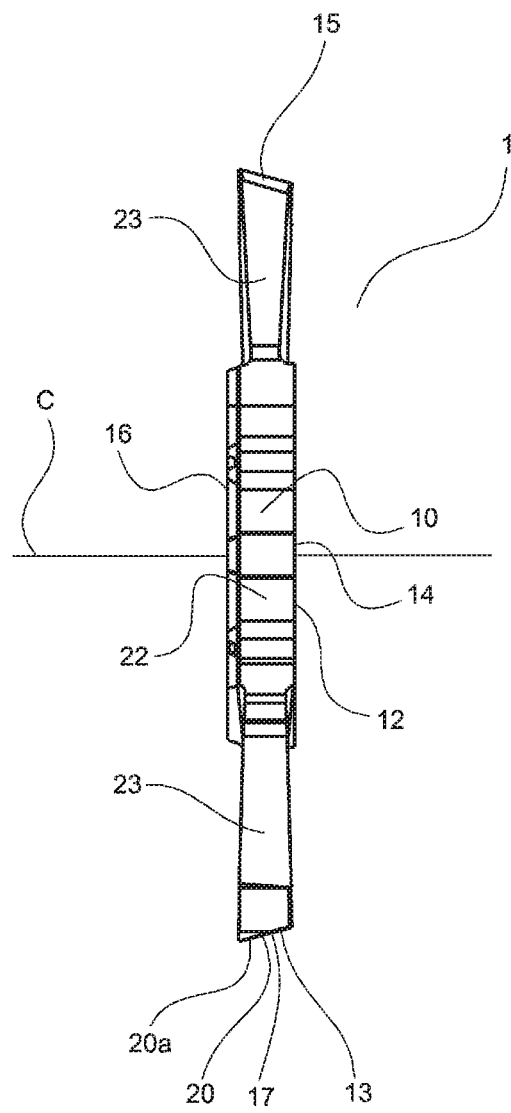
FIG. 6 is a plan view of the cutting tool of FIG. 1.
Figure 7:
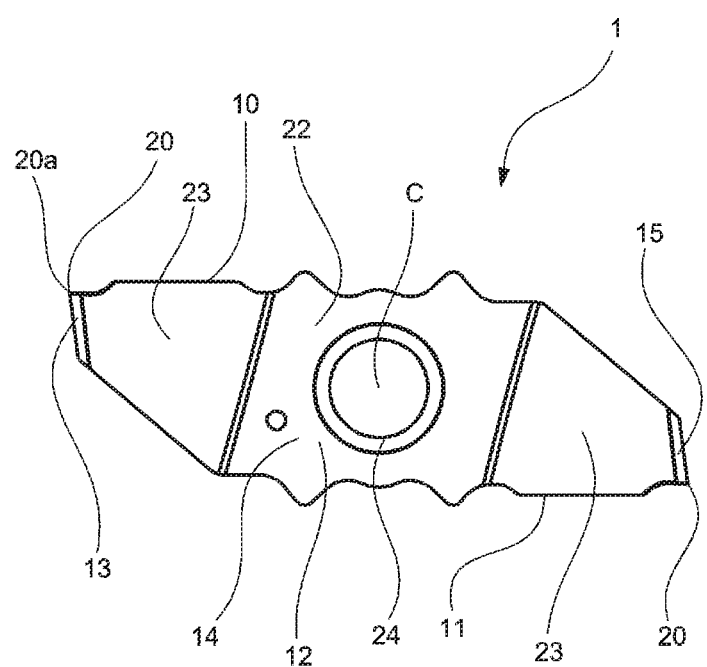
FIG. 7 is a right side view of the cutting tool of FIG. 1.
Figure 8:
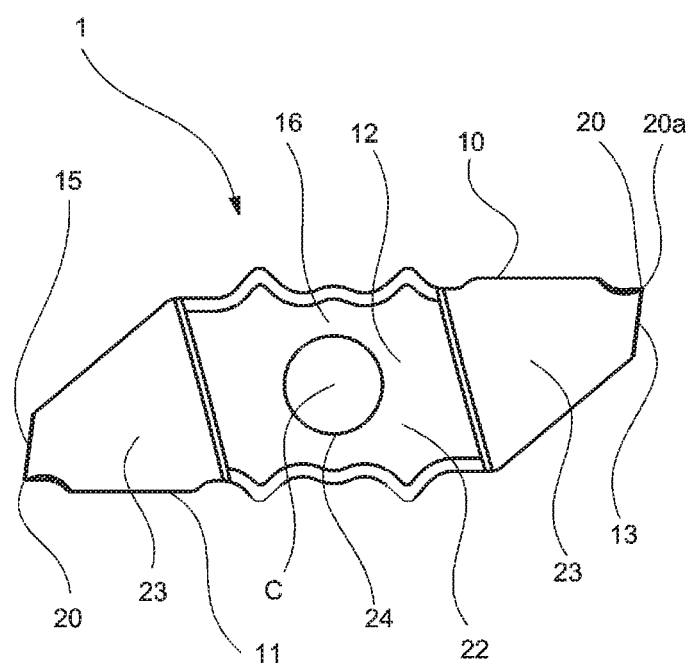
FIG. 8 is a left side view of the cutting tool of FIG. 1.

Each of FIGS. 1 to 3 and FIGS. 6 to 8 shows the shape of the cutting tool 1. The cutting tool 1 has a base 22, and two cutting portions 23 that protrude from the base 22. As shown in FIG. 6 serving as an end view (also referred to as a top view) in which the cutting tool 1 is viewed from a direction facing an end surface 10 in FIG. 1, the cutting tool 1 has a substantially polygonal first end surface 10. A portion of the first end surface 10 corresponding to the base 22 has a substantially quadrilateral (substantially rectangular) shape having sides in a longitudinal direction that are long in a vertical direction on a paper sheet with the drawing, and sides in a lateral direction that is perpendicular to the longitudinal direction. The two cutting portions 23 are formed integrally so as to be connected to both ends of the base 22 in the longitudinal direction. In addition, as shown in, e.g., FIG. 7, the cutting tool 1 has a second end surface 11 that opposes the first end surface 10. Herein, the first end surface 10 is referred to as an upper surface, and the second end surface 11 is referred to as a lower surface for the convenience of description. The cutting tool 1 has a peripheral side surface 12 that connects the upper surface 10 and the lower surface 11. The peripheral side surface 12 has first to fourth side surfaces 13, 14, 15, and 16 that serve as four side surface portions in this order circumferentially. In the end view shown in FIG. 6, the first side surface 13 faces the longitudinal direction, the second side surface 14 connected to the first side surface 13 faces the lateral direction, the third side surface 15 connected to the second side surface 14 faces the longitudinal direction opposite to the direction of the first side surface 13, and the fourth side surface 16 connected to the third side surface 15 and the first side surface 13 faces the lateral direction opposite to the direction of the second side surface 14. Herein, the side of the first side surface 13 is referred to as the front. The cutting tool 1 has a cutting edge 20 in an intersecting ridgeline portion between the upper surface 10 and the peripheral side surface 12. In other words, at least part of a connection portion between the upper surface 10 and the peripheral side surface 12 functions as the cutting edge 20. The cutting tool 1 also has the cutting edge 20 in an intersecting ridgeline portion between the lower surface 11 and the peripheral side surface 12. The cutting tool 1 has a hole 24 that extends through the second side surface 14 and the fourth side surface 16. As shown in FIGS. 1 and 6, a central axis C of the hole 24 is perpendicular to the second side surface 14 and the fourth side surface 16, and is parallel to the lateral direction. Note that the second and fourth side surfaces 14 and 16 are larger in area than the upper surface 10 and the lower surface 11. The fourth side surface 16 has a flat surface portion serving as a seating surface when the cutting tool 1 is attached to the holder 2 described later around the hole 24. The flat surface portion is the portion corresponding to the base 22 in FIG. 8. The flat surface portion has a substantially parallelogram shape. As shown in FIGS. 6 and 8, an intersecting ridgeline portion between the fourth side surface 16 and the upper surface 10 of the base 22 has a large chamfered surface. Similarly, an intersecting ridgeline portion between the fourth side surface 16 and the lower surface 11 of the base 22 has a large chamfered surface. The size of each chamfered surface is, e.g., about 0.5 mm.

Figure 9:
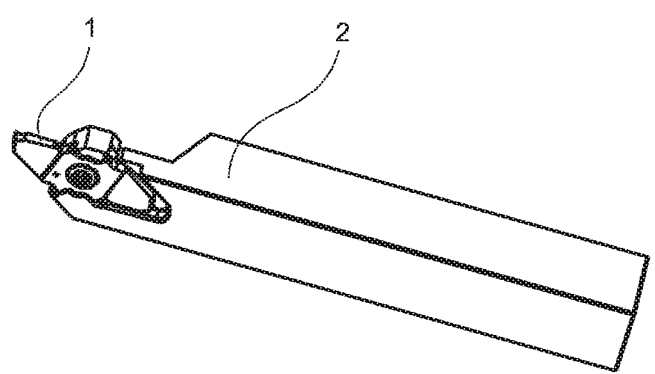
FIG. 9 is a perspective view of a state in which the cutting tool of FIG. 1 is attached to a holder.

As shown in FIG. 9, the cutting tool 1 can be attached to the slender holder 2 in a quadrangular prism shape that is long, e.g., in one direction. The cutting tool (cutting insert) 1 can be fixed to the holder 2 by pressing down the hole 24 by using a clamping member such as a clamp screw. For example, a female screw is provided in the holder 2, a male screw is inserted into the hole 24 and screwed with the female screw, the portion of the second side surface 14 corresponding to the base 22 is pressed in the direction of the holder 2 by using the head of the male screw, and the portion of the fourth side surface 16 corresponding to the base 22 is brought into contact with the holder 2, whereby it is possible to attach the cutting tool 1 to the holder 2. Further, two protrusions are formed on each of the side of the upper surface 10 and the side of the lower surface 11 of the base 22 of the cutting tool 1, and hence, by providing wall portions having curved surfaces curved so as to conform to the side of the upper surface 10 and the side of the lower surface 11 of the base 22 in an insert seat such that each wall portion opposes a surface formed of a curved surface of one or both of the two protrusions, and causing the surface formed of the curved surface of one or both of the two protrusions to come into contact with the wall portion of the insert seat of the holder 2 during cutting, it become possible to stably fix the cutting tool 1 to the holder 2 also in the direction of rotation of a workpiece. With this configuration, for example, the upper surface 10, the lower surface 11, and the fourth side surface 16 come into contact with the insert seat of the holder 2. In the case where the hole 24 of the cutting tool 1 is pressed down by using the clamp screw, the hole 24 may be configured so as to have an increased diameter portion whose diameter is increased toward the second side surface 14. That is, the hole 24 may be configured such that the shaft of the clamp screw can pass through the minimum diameter portion, and the head of the clamp screw comes into contact with the increased diameter portion of the hole 24.

The cutting tool 1 according to the embodiment is rotationally symmetrical by 180° about the central axis C of the hole 24. Consequently, the cutting tool 1 has two cutting edges 20 having the same shape. In the following description, one of the cutting edges 20 will be mainly described. The other cutting edge 20 is similar to the above cutting edge 20, and hence the description thereof will be omitted. The same applies to a peripheral shape other than the cutting edge 20. However, as shown in FIGS. 1 and 7, there are cases where the cutting tool 1 is provided with a mark indicative of the order of use of the cutting edge. The cutting tool 1 according to the embodiment has a round concave mark at one position on the side of one of the cutting edges 20. Asymmetry resulting from such a mark is permitted.

Figure 3:
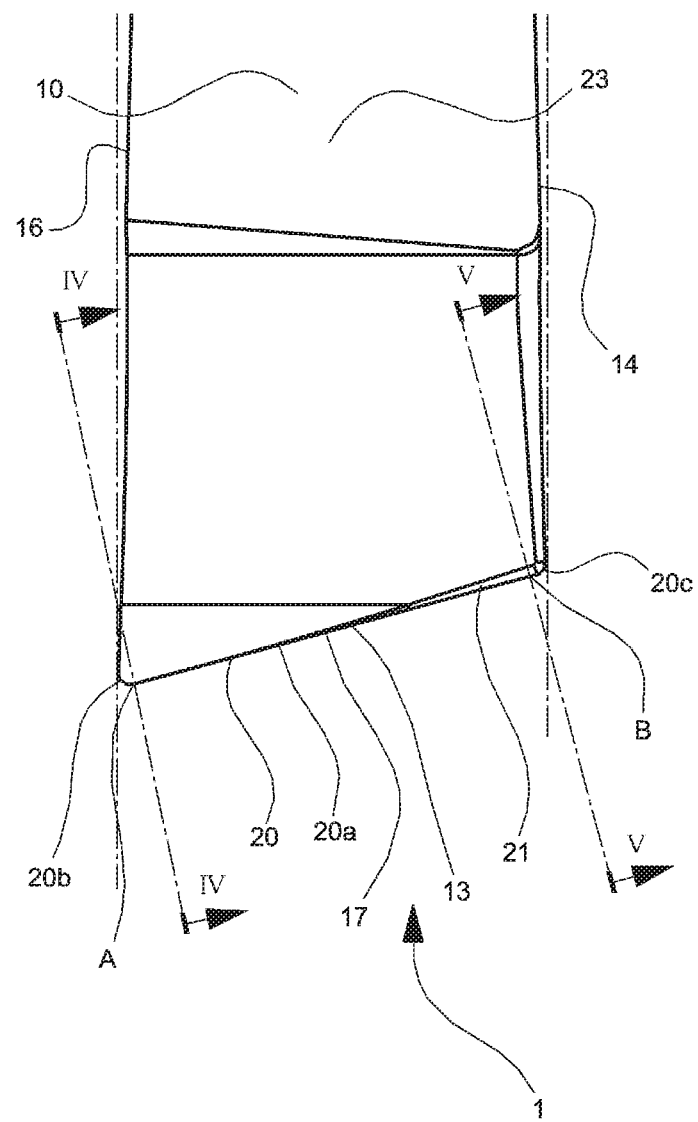
FIG. 3 is a partially enlarged plan view of the cutting tool of FIG. 1.

As shown in FIG. 3, a first ridgeline 17 is formed between the upper surface 10 and the first side surface 13, and the first ridgeline 17 includes a first cutting edge 20a. Herein, the first cutting edge 20a is referred to as a front cutting edge. In addition, a second ridgeline 18 is formed between the upper surface 10 and the second side surface 14, and a third ridgeline 19 is formed between the upper surface 10 and the fourth side surface 16. A first corner cutting edge 20b connected to the first cutting edge 20a is disposed between the first cutting edge 20a and the third ridgeline 19, i.e., at an end portion of the first cutting edge 20a on the side of the fourth side surface 16. A second corner cutting edge 20c connecting to the first cutting edge 20a is disposed between the first cutting edge 20a and the second ridgeline 18, i.e., at an end portion of the first cutting edge 20a on the side of the second side surface 14. In the first cutting edge 20a, the side of the first corner cutting edge 20b protrudes further toward an outer side of the cutting tool than the side of the second corner cutting edge 20c. That is, in FIG. 3 in which the cutting tool 1 is viewed from the direction facing the upper surface 10, the left side of the first cutting edge 20a extends downward. In other words, when viewed from the direction facing the upper surface 10, the direction of extension of the first cutting edge 20a forms an acute angle with the fourth side surface 16. Consequently, as shown in the top view shown in FIG. 6, when the central axis C that vertically passes through the central portion of the second side surface 14 and the central portion of the fourth side surface 16 in the base 22 of the cutting tool 1 is used as a reference, the first cutting edge 20a is inclined relative to the second side surface 14 and the fourth side surface 16 such that a distance between the central axis C and the first cutting edge 20a increases toward the fourth side surface 16 from the second side surface 14. Further, the second side surface 14 and the fourth side surface 16 in the cutting portion 23 are also slightly inclined relative to a direction perpendicular to the central axis C. Specifically, in the top view, the fourth side surface 16 is inclined relative to the direction perpendicular to the central axis C so as to approach the second side surface 14 as a distance to the central axis C from the first corner cutting edge 20b formed at the end portion of the first cutting edge 20a formed in the first ridgeline 17 that connects the upper surface 10 and the first side surface 13 increases. In addition, the second side surface 14 is inclined relative to the direction perpendicular to the central axis C so as to approach the fourth side surface 16 as a distance to the central axis C from the second corner cutting edge 20c formed at the other end portion of the first cutting edge 20a increases. Consequently, as shown in, e.g., FIG. 6, the width of the cutting portion 23 in the lateral direction in the top view gradually increases toward to the first side surface 13 or the third side surface 15 as a distance from the base 22 increases. The first cutting edge 20a forms an interior angle with the fourth side surface 16, and extends in a direction of, e.g., about 85°. The length of the first cutting edge 20a is, e.g., about 2 mm. When viewed from the direction facing the upper surface 10, the first corner cutting edge 20b has a substantially arc shape, and the radius of curvature thereof is, e.g., about 0.2 mm. When viewed from the direction facing the upper surface 10, the second corner cutting edge 20c has a substantially arc shape, and the radius of curvature thereof is, e.g., about 0.2 mm. When the cutting tool 1 is attached to the holder 2, parting or grooving is performed on the workpiece that rotates about an axis parallel to the central axis C by, e.g., moving the cutting tool 1 in the direction perpendicular to the central axis C relative to the workpiece. Consequently, the length of the first cutting edge 20a corresponds to the width of parting or grooving performed on the workpiece. A circumscription dimension from the first corner cutting edge 20b to the second corner cutting edge 20c is, e.g., about 2 mm.

The circumscription dimension from the second side surface 14 to the fourth side surface 16 in the cutting tool 1 is, e.g., about 3 mm. The circumscription dimension from the first side surface 13 to the third side surface 15 in the cutting tool 1 is, e.g., about 28 mm. The circumscription dimension from the upper surface 10 to the lower surface 11 in the cutting tool 1 is, e.g., about 11 mm. The diameter of the hole 24 is, e.g., about 5 mm at the minimum diameter portion. The hole 24 has a shape corresponding to the clamp screw of, e.g., M4.5 (metric thread).

Figure 4:
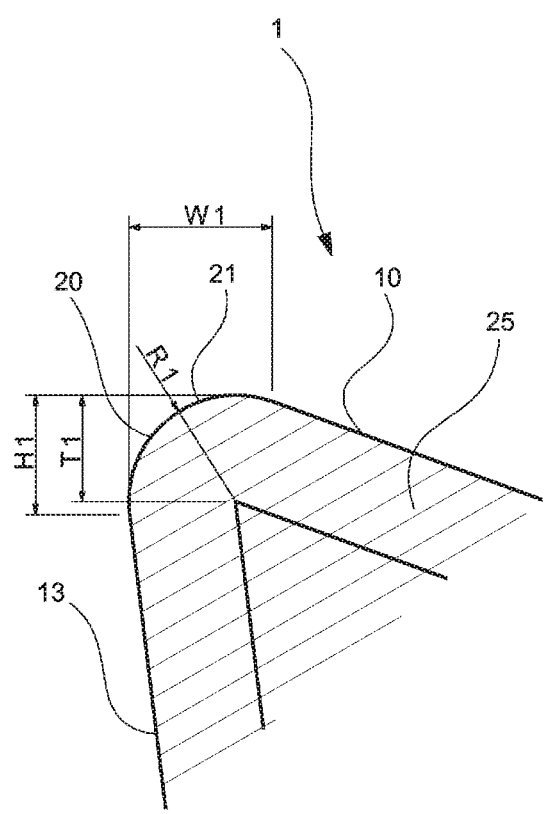
FIG. 4 is an enlarged cross-sectional view taken along a IV-IV section of FIG. 3.
Figure 5:
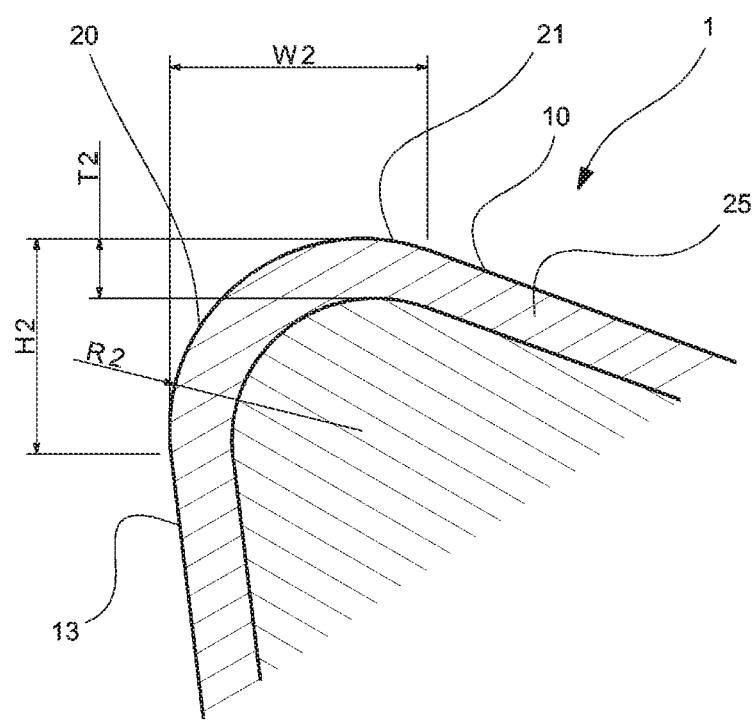
FIG. 5 is an enlarged cross-sectional view taken along a V-V section of FIG. 3.

The cutting tool 1 has a coating film 25 formed by the PVD method (an abbreviation of physical vapor deposition) on its surface. As shown in FIG. 3, any two points that are positioned in an area close to the fourth side surface 16 and an area close to the second side surface 14 are set on the cutting edge 20, and are referred to as a first point A and a second point B. Accordingly, the first point A is the point closer to the first corner cutting edge 20b than to the second corner cutting edge 20c, and the second point B is the point closer to the second corner cutting edge 20c than to the first corner cutting edge 20b. The first and second points A and B are disposed at outermost end portions of a honing surface 21. The first point A is positioned further toward an outer side of the cutting tool 1 than the second point B (outwardly in the longitudinal direction orthogonal to the rotation central axis C in the end view). FIGS. 4 and 5 show the cross-sectional shapes of the cutting edge 20 in a IV-IV section and a V-V section in FIG. 3. That is, FIGS. 4 and 5 show the cross-sectional shapes of the cutting edge 20 in the IV-IV section and the V-V section orthogonal to the first cutting edge 20a and the upper surface 10. The IV-IV section is the section that passes through the first point A on the side of the first corner cutting edge 20b, and the V-V section is the section that passes through the second point B on the side of the second corner cutting edge 20c. As shown in FIG. 4, the average thickness of the coating film 25 of the cutting edge 20 in the IV-IV section is a first thickness T1. Note that the average thickness mentioned herein denotes a thickness from which an influence of minute depressions and projections on the surface and interface of the coating film 25 is eliminated. In addition, also in the case where the thickness on the side of a rake face is different from that on the side of a flank, the thicknesses may be averaged and compared. As shown in FIG. 5, the average thickness of the coating film 25 of the cutting edge 20 (honing surface 21) in the V-V section is a second thickness T2. In the cutting tool 1 according to the embodiment, the first thickness T1 is, e.g., about 1 μm, and the second thickness T2 is, e.g., about 5 μm. That is, the first thickness T1 is about 20% of the second thickness T2. In other words, a difference between the second thickness T2 and the first thickness T1 is about 80% of the second thickness T2. Note that the cross-sectional shape in FIG. 4 is enlarged for easier understanding of the cross-sectional shape. Consequently, in the cutting tool 1 according to the present embodiment, the thickness T2 of the coating film 25 at the second point B is about five times as large as the thickness T1 of the coating film 25 at the first point A. However, the cutting tool 1 according to the present embodiment is not limited thereto, and the thickness T2 may also be at least about twice as large as the thickness T1. Accordingly, the magnification of the cross-sectional shape in FIG. 4 is different from that of the cross-sectional shape in FIG. 5. In addition, when the entire cutting tool 1 according to the embodiment is viewed, the upper surface 10 and the lower surface 11 are parallel to each other, and hence the IV-IV section and the V-V section orthogonal to the upper surface 10 are also orthogonal to the lower surface 11.

As shown in FIG. 3, the cutting edge 20 is provided with the honing surface 21. As shown in FIG. 4, the radius of curvature of the cutting edge 20 in the IV-IV section is a first radius of curvature R1. As shown in FIG. 5, the radius of curvature of the cutting edge 20 (honing surface 21) in the V-V section is a second radius of curvature R2. The cross-sectional shape of the cutting edge 20 on the side of the first corner cutting edge 20b is a substantially arc shape having the first radius of curvature R1 of, e.g., about 0.001 mm. That is, as shown in FIG. 4, in the cutting edge 20, a portion without the coating film, i.e., a base material portion from which the coating film 25 is removed and is formed of an ultra-high pressure sintered body or the like is formed so as to be sharp, i.e., so as to have an edge, and roundness is provided by the coating film 25. In this manner, a honing area is not formed in the base material portion, and the thickness of the coating film 25 formed on the surface of the base material portion is made small, and hence minute roundness is provided. On the other hand, the cross-sectional shape of the cutting edge 20 (honing surface 21) on the side of the second corner cutting edge 20c is a substantially arc shape having the second radius of curvature R2 of, e.g., about 0.03 mm. In this manner, by forming the honing area in the base material portion and increasing the thickness of the coating film 25 formed on the surface of the base material portion, it becomes possible to form the large honing surface 21 in the cutting edge 20. That is, the first radius of curvature R1 of the cutting edge 20 in a vertical section is about 3% of the second radius of curvature R2.

As shown in FIG. 4, the width of the cutting edge 20 in the IV-IV section when viewed from the direction facing the upper surface 10 is a first width W1. As shown in FIG. 5, the width of the cutting edge 20 (honing surface 21) in the V-V section when viewed from the direction facing the upper surface 10 is a second width W2. In the cutting tool 1 according to the embodiment, the first width W1 on the side of the first corner cutting edge 20b is, e.g., about 0.001 mm, and the second width W2 on the side of the second corner cutting edge 20c is, e.g., about 0.03 mm. That is, the first width W1 is about 3% of the second width W2.

As shown in FIG. 4, the height of the cutting edge 20 in the IV-IV section when viewed from a direction facing the first side surface 13 is a first height H1. As shown in FIG. 5, the height of the cutting edge 20 (honing surface 21) in the V-V section when viewed from the direction facing the first side surface 13 is a second height H2. In the cutting tool 1 according to the embodiment, the first height H1 on the side of the first corner cutting edge 20b is, e.g., about 0.001 mm, and the second height H2 on the side of the second corner cutting edge 20c is, e.g., about 0.03 mm. That is, the first height H1 is about 3% of the second height H2. Further, the base material portion has the edge in the vicinity of one end of the cutting edge 20a connected to the first corner cutting edge 20b, and a honing area, which increases in width and height in the end view and a side view as a distance to the second corner cutting edge 20c decreases, is formed from an intermediate point of the cutting edge 20a to the other end of the cutting edge 20a at the second corner cutting edge 20c. In addition, the thickness of the coating film 25 formed in an area including the surface of the base material portion is about 0.001 mm (1 μm), which is small, in the vicinity of one end of the cutting edge 20a connected to the first corner cutting edge 20b, and the thickness thereof increases with approach to the second corner cutting edge 20c up to the other end at the second corner cutting edge 20c. Consequently, as shown in FIG. 3, the cutting edge 20a has the honing surface 21 over the entire area of the cutting edge 20a from one end of the cutting edge 20a connected to the first corner cutting edge 20b to the other end at the second corner cutting edge 20c, and the width of the honing surface 21 gradually increases (i.e., monotonously increases) in the end view and the side view (not shown). Consequently, an angle formed between the fourth side surface 16 in the cutting portion 23 and the boundary between the honing surface 21 of the cutting edge 20a and the rake face of the upper surface 10 is smaller than an angle formed between the fourth side surface 16 in the cutting portion 23 and the boundary of the cutting edge 20a farthest from the central axis C in the end view. Note that an area in which the width or height of the honing surface 21 is constant may be partially provided. In addition, portions in which the width or height of the honing surface 21 locally decreases may be present at both end portions of the cutting edge 20a. However, it is preferable to form an area in which the honing width and height in the end view gradually increase in at least over half of the cutting edge 20a.

A portion of the peripheral side surface 12 connected to the cutting edge 20 functions as the flank. In the cutting tool 1 according to the embodiment, a portion of the first side surface 13 connected to the first cutting edge 20a is provided with a positive clearance angle in the cutting tool 1 alone. The clearance angle in the cutting tool 1 alone is, e.g., about 7°.

The cutting tool 1 has a chip breaker on the upper surface 10. A portion of the upper surface 10 connected to the cutting edge 20 functions as the rake face. In the cutting tool 1 according to the embodiment, a portion of the upper surface 10 connected to the first cutting edge 20a is provided with a positive rake angle in the cutting tool 1 alone. The "positive rake angle" mentioned herein denotes an angle in the case where the upper surface 10 is inclined so as to approach the second end surface 11 with distance from the first cutting edge 20a. The rake angle in the cutting tool 1 alone is, e.g., about 20°. Consequently, the cutting tool 1 has the positive rake angle and the positive clearance angle, and the second side surface 14 and the fourth side surface 16 are inclined such that the width in the lateral direction in the end view decreases with distance from the first cutting edge 20a. Accordingly, it becomes possible to assure the sharpness of the first cutting edge 20a, and particularly the smoothness of the finished surface of the workpiece. In addition, it is possible to reduce the possibility that the second side surface 14 and the fourth side surface 16 collide with the finished surface or the like during cutting by the first cutting edge 20a to implement preferable cutting by the first cutting edge 20a.

Next, a cutting tool 100 according to a second embodiment will be described. In the description of the cutting tool 100, only main differences from the cutting tool 1 according to the first embodiment will be described. The same components are designated by the same reference numerals, and the description thereof will be omitted.

Each of FIGS. 10 to 13 shows the shape of the cutting tool 100. The cutting tool 100 has the base 22, and the two cutting portions 23 that protrude from the base 22. The cutting tool 100 according to the embodiment is rotationally symmetrical by 180° about the central axis C of the hole 24. Consequently, the cutting tool 100 has two cutting edges 120 having the same shape. In the following description, one of the cutting edges 120 will be mainly described. The other cutting edge 120 is similar to the above cutting edge 120, and hence the description thereof will be omitted. Similarly, the description of a peripheral shape other than the cutting edge 120 will be omitted.

Figure 10:
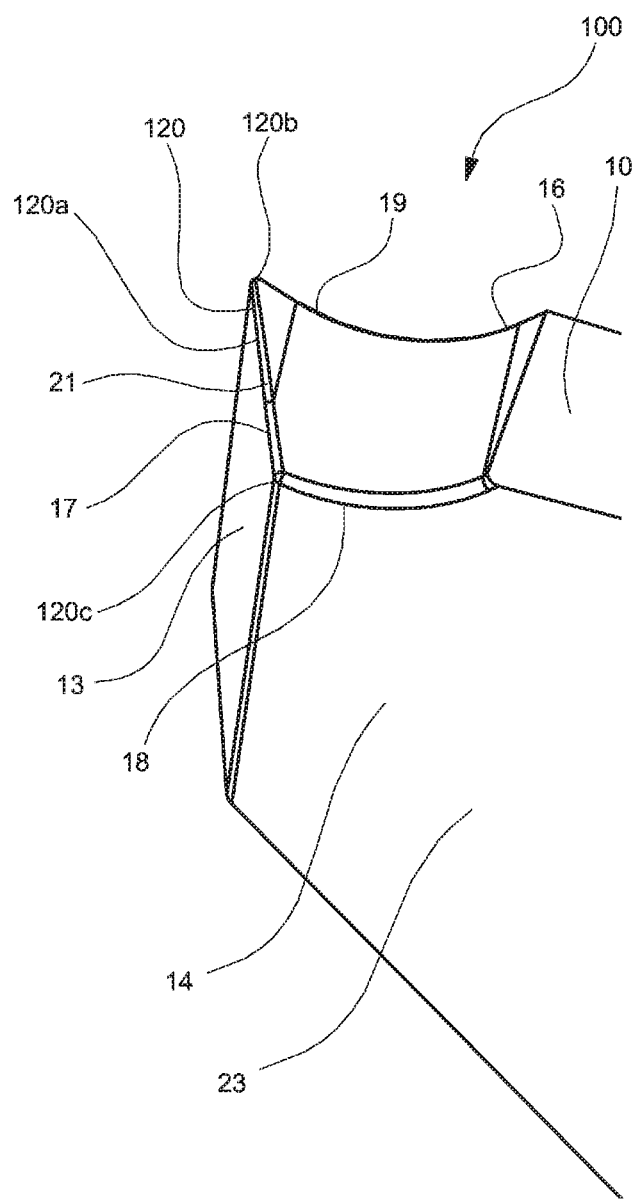
FIG. 10 is a partially enlarged perspective view of a cutting tool (cutting insert) according to a second embodiment of the present invention.
Figure 11:
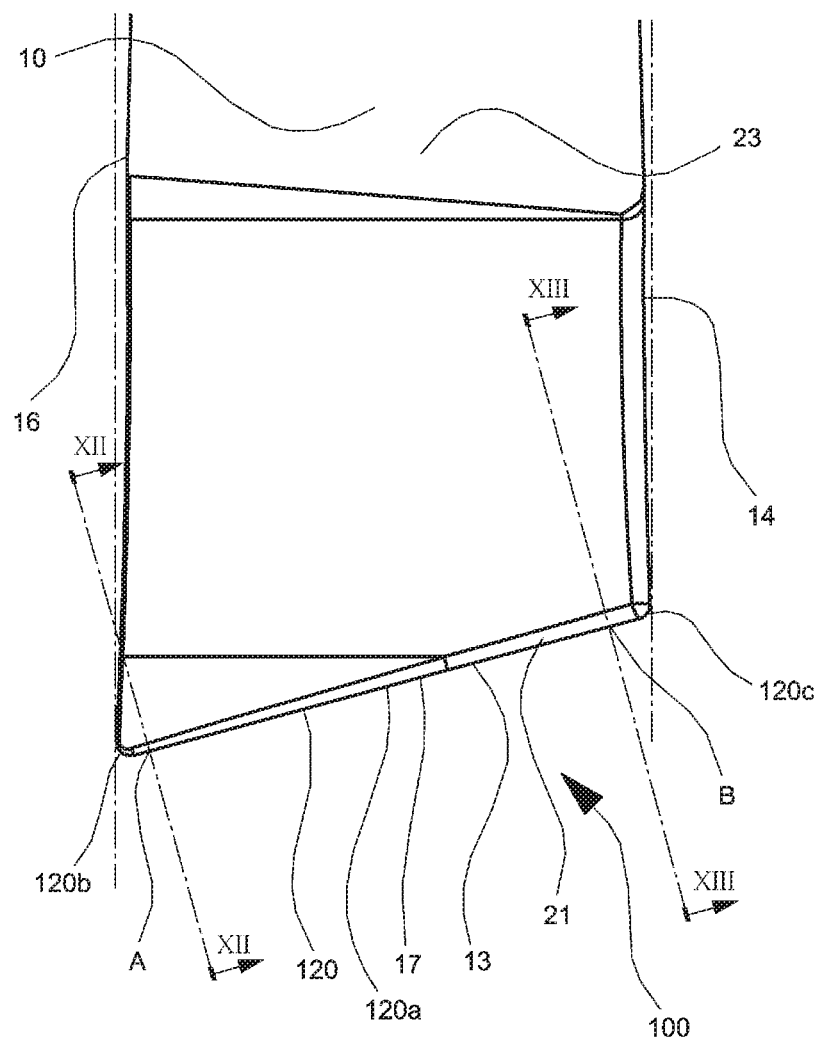
FIG. 11 is a partially enlarged plan view of the cutting tool of FIG. 10.

As shown in FIGS. 10 and 11, the first ridgeline 17 is formed between the upper surface 10 and the first side surface 13, and the first ridgeline 17 includes a third cutting edge 120a. Herein, the third cutting edge 120a is referred to as the front cutting edge. In addition, the second ridgeline 18 is formed between the upper surface 10 and the second side surface 14, and the third ridgeline 19 is formed between the upper surface 10 and the fourth side surface 16. A third corner cutting edge 120b connected to the third cutting edge 120a is disposed between the third cutting edge 120a and the third ridgeline 19, i.e., at an end portion of the third cutting edge 120a on the side of the fourth side surface 16. A fourth corner cutting edge 120c connected to the third cutting edge 120a is disposed between the third cutting edge 120a and the second ridgeline 18, i.e., at an end portion of the third cutting edge 120a on the side of the second side surface 14. In the third cutting edge 120a, the side of the third corner cutting edge 120b protrudes further toward an outer side of the cutting tool than the side of the fourth corner cutting edge 120c. That is, in FIG. 11 in which the cutting tool 100 is viewed from the direction facing the upper surface 10, the left side of the third cutting edge 120a extends downward. In other words, when viewed from the direction facing the upper surface 10, the direction of extension of the third cutting edge 120a forms an acute angle with the fourth side surface 16. The third cutting edge 120a forms an interior angle with the fourth side surface 16, and extends in a direction of, e.g., about 85°. Consequently, as shown in the top view shown in FIG. 11, when a straight line in the lateral direction that vertically passes through the second side surface 14 and the fourth side surface 16 of the cutting tool 100 is used as a reference, the third cutting edge 120a is inclined relative to the second side surface 14 and the fourth side surface 16 such that a distance between the straight line and the third cutting edge 120a increases toward the fourth side surface 16 from the second side surface 14. The length of the third cutting edge 120a is, e.g., about 2 mm. When viewed from the direction facing the upper surface 10, the third corner cutting edge 120b has a substantially arc shape, and the radius of curvature thereof is, e.g., about 0.2 mm. When viewed from the direction facing the upper surface 10, the fourth corner cutting edge 120c has a substantially arc shape, and the radius of curvature thereof is, e.g., about 0.2 mm. When the cutting tool 100 is attached to the holder 2, a circumscription dimension from the third corner cutting edge 120b to the fourth corner cutting edge 120c that corresponds to the width of parting or grooving performed on the workpiece is, e.g., about 2 mm.

Figure 12:
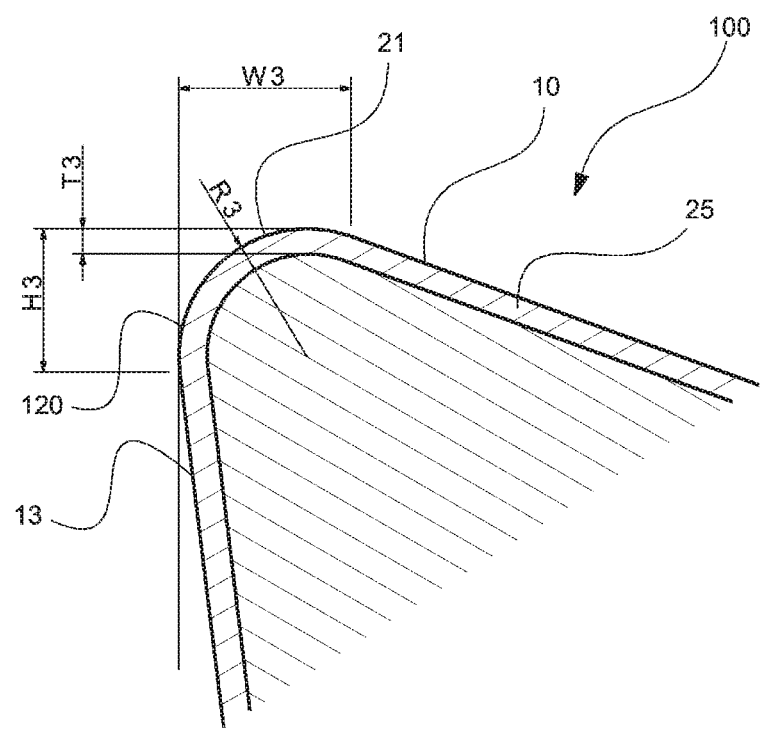
FIG. 12 is an enlarged cross-sectional view taken along a XII-XII section of FIG. 11.
Figure 13:
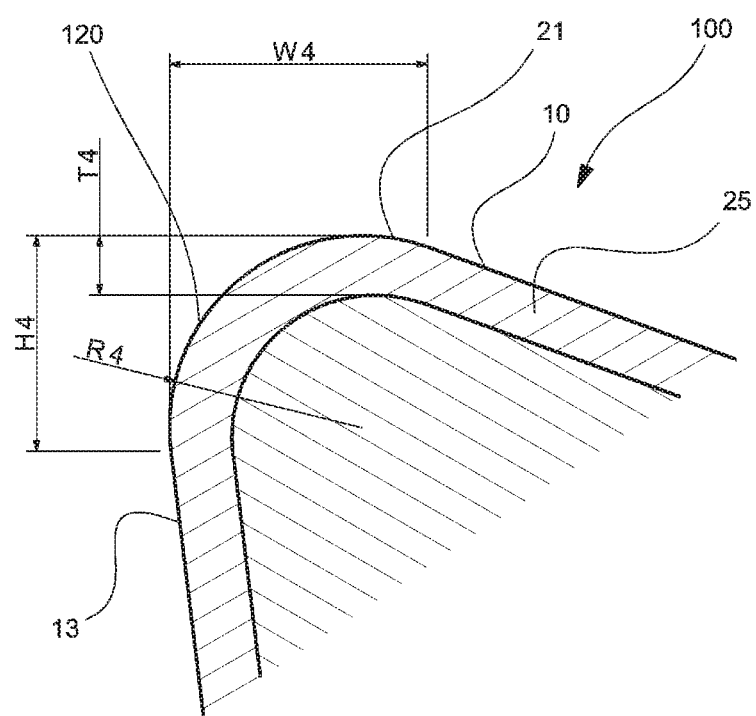
FIG. 13 is an enlarged cross-sectional view taken along a XIII-XIII section of FIG. 12.

The cutting tool 100 has the coating film 25 formed by the CVD method (an abbreviation of chemical vapor deposition) on its surface. Any two points including a first point closer to the fourth side surface 16 than to the second side surface 14 and a second point closer to the second side surface 14 than to the fourth side surface 16 are set on the cutting edge 120, and are referred to as a first point A and a second point B. Consequently, the first point A is the point on the side of the third corner cutting edge 120b and the second point B is the point on the side of the fourth corner cutting edge 120c, and hence the first point A protrudes further toward an outer side of the cutting tool 1 than the second point B. A distance between the first point A and the second point B is preferably not less than half of the entire length of the third cutting edge 120a. FIGS. 12 and 13 show the cross-sectional shapes of the cutting edge 120 in a XII-XII section and a XIII-XIII section in FIG. 11. That is, FIGS. 12 and 13 show the cross-sectional shapes of the cutting edge 120 in the XII-XII section and the XIII-XIII section orthogonal to the third cutting edge 120a and the upper surface 10. The XII-XII section is the section that passes through the first point A on the side of the third corner cutting edge 120b, and the XIII-XIII section is the section that passes through the second point B on the side of the fourth corner cutting edge 120c. As shown in FIG. 12, the average thickness of the coating film 25 of the cutting edge 120 (honing surface 21) in the XII-XII section is a third thickness T3. As shown in FIG. 13, the average thickness of the coating film 25 of the cutting edge 120 (honing surface 21) in the XIII-XIII section is a fourth thickness T4. In the cutting tool 100 according to the embodiment, the third thickness T3 is, e.g., about 5 μm, and the fourth thickness T4 is, e.g., about 10 μm. That is, the third thickness T3 is about 50% of the fourth thickness T4. In other words, a difference between the fourth thickness T4 and the third thickness T3 is about 50% of the fourth thickness T4. Note that, when the entire cutting tool 100 according to the embodiment is viewed, the upper surface 10 and the lower surface 11 are parallel to each other, and hence the XII-XII section and the XIII-XIII section orthogonal to the upper surface 10 are also orthogonal to the lower surface 11.

As shown in FIGS. 10 and 11, the cutting edge 120 is provided with the honing surface 21. As shown in FIG. 12, the radius of curvature of the cutting edge 120 (honing surface 21) in the XII-XII section is a third radius of curvature R3. As shown in FIG. 13, the radius of curvature of the cutting edge 120 (honing surface 21) in the XIII-XIII section is a fourth radius of curvature R4. The cross-sectional shape of the cutting edge 120 on the side of the third corner cutting edge 120b is a substantially arc shape having the third radius of curvature R3 of, e.g., about 0.03 mm. The cross-sectional shape of the cutting edge 120 (honing surface 21) on the side of the fourth corner cutting edge 120c is a substantially arc shape having the fourth radius of curvature R4 of, e.g., about 0.05 mm. That is, the third radius of curvature R3 is about 60% of the fourth radius of curvature R4.

As shown in FIG. 12, the width of the cutting edge 120 (honing surface 21) in the XII-XII section when viewed from the direction facing the upper surface 10 is a third width W3. As shown in FIG. 13, the width of the cutting edge 120 (honing surface 21) in the XIII-XIII section when viewed from the direction facing the upper surface 10 is a fourth width W4. In the cutting tool 100 according to the embodiment, the third width W3 on the side of the third corner cutting edge 120b is, e.g., about 0.03 mm, and the fourth width W4 on the side of the fourth corner cutting edge 120c is, e.g., about 0.05 mm. That is, the third width W3 is about 60% of the fourth width W4.

As shown in FIG. 12, the height of the cutting edge 120 (honing surface 21) in the XII-XII section when viewed from the direction facing the first side surface 13 is a third height H3. As shown in FIG. 13, the height of the cutting edge 120 (honing surface 21) in the XIII-XIII section when viewed from the direction facing the first side surface 13 is a fourth height H4. In the cutting tool 100 according to the embodiment, the third height H3 on the side of the third corner cutting edge 120b is, e.g., about 0.03 mm, and the fourth height H4 on the side of the fourth corner cutting edge 120c is, e.g., about 0.05 mm. That is, the third height H3 is about 60% of the fourth height H4. Further, in a base material portion that has the coating film 25 formed on its surface and is formed of the ultra-high pressure sintered body, a honing area that gradually increases in width and height is formed from a portion connected to the third corner cutting edge 120b to a portion connected to the fourth corner cutting edge 120c. The thickness of the coating film 25 formed in an area including the surface of the base material portion is about 0.03 mm (30 μm), which is small, in the vicinity of one end of the cutting edge 120a connected to the third corner cutting edge 120b, and the thickness thereof increases with approach to the fourth corner cutting edge 120c up to the other end at the fourth corner cutting edge 120c at which the thickness of the formed film is about 0.05 mm (50 μm), which is large. Consequently, the cutting edge 120a has the honing surface 21 over the entire area of the cutting edge 120a from one end of the cutting edge 120a connected to the third corner cutting edge 120b to the other end at the fourth corner cutting edge 120c, and the width of the honing surface 21 gradually increases (i.e., monotonously increase) in the end view and the side view. Note that an area in which the width or height of the honing surface 21 is constant may be partially provided. In addition, portions in which the width or height of the honing surface 21 locally decreases may be present at both end portions of the cutting edge 120a. However, it is preferable to form an area in which the honing width and height in the end view gradually increase in at least over half of the cutting edge 120a.

A portion of the peripheral side surface 12 connected to the cutting edge 120 functions as the flank. In the cutting tool 100 according to the embodiment, a portion of the first side surface 13 connected to the third cutting edge 120a is provided with a positive clearance angle in the cutting tool 100 alone. The clearance angle in the cutting tool 100 alone is, e.g., about 7°.

The cutting tool 100 has the chip breaker on the upper surface 10. A portion of the upper surface 10 connected to the cutting edge 120 functions as the rake face. In the cutting tool 100 according to the embodiment, a portion of the upper surface 10 connected to the third cutting edge 120a is provided with a positive rake angle in the cutting tool 100 alone. The rake angle in the cutting tool 100 alone is, e.g., about 20°.

The material of the cutting tool 1 or 100 around the cutting edge 20 or 120 is not particularly limited, and the material is appropriately selected from materials obtained by coating surfaces of hard materials such as, e.g., a cemented carbide, a cermet, ceramic, and a sintered body containing cubic boron nitride with coating films formed by PVD or CVD.

The thus configured cutting tool (cutting insert) 1 or 100 is manufactured in the following manner. First, the outside shape of the cutting tool 1 is formed by pressing and sintering a material. Thereafter, polishing or the like is performed on an as needed basis. At this point, the honing surface 21 is also formed. In the case of the cutting tool 1, the edge is left in the first cutting edge 20a in the vicinity of the first corner cutting edge 20b, and the honing surface 21 that increases in size with approach to the second corner cutting edge 20c is formed from an intermediate point of the first cutting edge 20a. In the case of the cutting tool 100, the honing surface 21 that increases in size with approach to the fourth corner cutting edge 120c is formed from the third cutting edge 120a in the vicinity of the third corner cutting edge 120b. The honing surface 21 can be formed by various known methods such as a machining method that uses a brush, a machining method that uses free abrasive grains, a machining method that uses a rubber wheel, and a machining method that uses a laser beam in addition to a machining method that uses a grinding wheel.

Further, the coating film 25 formed by the PVD method or CVD method is added. As a method for changing the thickness of the coating film 25, a method that removes part of the coating film 25 is available. An example of the method that removes part of the coating film 25 includes a machining method that uses a brush. In the machining method that uses a brush, it is possible to adjust a removal amount by changing the degree of contact of the brush with the cutting edge 20 or 120 to be machined. For example, the degree of contact of the brush is adjusted such that the brush tightly comes into contact with the side of the first corner cutting edge 20b, and the brush loosely comes into contact with the side of the second corner cutting edge 20c. It is possible to adjust the thickness of the coating film 25 by, e.g., changing the angle of contact of the brush. Note that, another method that removes part of the coating film 25 includes a machining method that uses free abrasive grains or a method that uses a laser beam.

Note that the method for changing the thickness of the coating film 25 is not limited to the method that removes part of the coating film 25. It is possible to form the coating film 25 such that the thickness thereof changes gradually by, e.g., adjusting conditions during coating. An example of the method for adjusting conditions during coating includes a method that forms a shadow by a mask in the PVD method. When the shadow by the mask is formed, the coating film 25 is not formed in the portion of the shadow basically. It is possible to adjust the thickness of the coating film 25 by moving the mask during coating. For example, by starting the formation of the shadow by the mask in part of the cutting edge 20 or 120 when the coating film 25 in a portion in which the coating film 25 is thin is formed, and gradually moving the mask, it is possible to manufacture the cutting tool 1 or 100 in which the film thickness gradually changes to any film thickness depending on the position in the cutting edge 20 or 120. In addition, it is also possible to adjust the thickness of the coating film 25 by disposing the mask at a position slightly away from the cutting edge 20 or 120. By disposing the mask at the position slightly away from the cutting edge 20 or 120, the darkness of the shadow at a boundary portion gradually changes and, as a result, it is possible to gradually change the thickness of the coating film 25 of the cutting edge 20 or 120. Thus, it is possible to gradually change the thickness of the coating film 25 of the cutting edge 20 or 120 by disposing the cutting edge 20 or 120 and disposing the mask near the cutting edge 20 or 120 when the coating film 25 is formed by PVD or the like, and performing coating while relatively moving the mask, i.e., by performing coating while relatively moving the mask such that the area of the cutting edge 20 or 120 exposed to a target of a coating material is gradually increased in an initial state in which an area in the vicinity of the second corner cutting edge 20c or the fourth corner cutting edge 120c in which it is desired to increase the thickness of the coating film 25 is exposed to the target of the coating material, and the other area including the first corner cutting edge 20b or the second corner cutting edge 120b is masked.

Note that, in the case where the size of the honing surface 21 is changed, a machining condition is adjusted according to the machining portion of the cutting edge 20 or 120. For example, in the case of a machining method that uses a brush, it is possible to adjust the cross-sectional shape and various dimensions of the honing surface 21 to be formed by changing the angle of contact of the brush. For example, when the angle of contact of the brush is adjusted such that the brush loosely comes into contact with the side of the first corner cutting edge and the brush tightly comes into contact with the side of the second corner cutting edge, the honing surface 21 in the cutting tool 1 according to the first embodiment is obtained.

As shown in FIG. 9, the cutting tool 1 or 100 is attached to the holder 2 by inserting the clamp screw into the hole 24 and clamping the hole 24 by using the clamp screw. Note that the method for fixing the cutting tool 1 or 100 is not particularly limited, and the cutting tool 1 or 100 may be fixed by using a presser piece, a wedge, a lever, or an eccentric pin. During lathe machining, a workpiece is fixed to a chuck of a lathe, and is rotated about the horizontal axis. Subsequently, the side of the cutting edge 20 or 120 of the cutting tool 1 or 100 is moved close to the workpiece, and the workpiece is cut using the cutting edge 20 or 120.

Next, the operation and effect achieved by the cutting tool 1 or 100 according to the embodiments will be described. In addition, the preferred mode of the present invention will also be described.

The cutting tool 1 or 100 is suitable for parting and grooving by a lathe. When the cutting tool 1 or 100 is used in parting or grooving, the first cutting edge 20a or the third cutting edge 120a is preferably used as the front cutting edge. In the cutting tool 1 according to the first embodiment, the width of the groove to be formed is determined by the first cutting edge 20a, the first corner cutting edge 20b, and the second corner cutting edge 20c. In the cutting tool 100 according to the second embodiment, the width of the groove to be formed is determined by the third cutting edge 120a, the third corner cutting edge 120b, and the fourth corner cutting edge 120c.

As described above, with regard to the thickness of the coating film 25 of the cutting tool 1, the first thickness T1 on the side of the first corner cutting edge 20b is smaller than the second thickness T2 on the side of the second corner cutting edge 20c. With regard to the thickness of the coating film 25 of the cutting tool 100, the third thickness T3 on the side of the third corner cutting edge 120b is smaller than the fourth thickness T4 on the side of the fourth corner cutting edge 120c. For example, in parting, when the first cutting edge 20a or the third cutting edge 120a is used as the front cutting edge, and the side of the first corner cutting edge 20b or the side of the third corner cutting edge 120b protrudes to the tip side, the first corner cutting edge 20b or the third corner cutting edge 120b functions as a cutting edge for finishing the machined surface of the workpiece that is cut off, and hence a small cross-sectional shape having excellent sharpness is preferable. In a portion in which the coating film 25 is thin, it is preferable to reduce the honing surface. It is further preferable to form the portion in which the coating film 25 is thin into the sharp cutting edge 20 with no honing surface, as in the cutting tool 1.

In the portion in which the coating film 25 is thin, it is possible to improve the sharpness of the cutting edge 20 or 120 in combination with the small cross-sectional shape. On the other hand, a portion in which the coating film 25 is thick becomes resistant to wear, and allows an increase in the life of the cutting tool 1 or 100. The difference in the thickness of the coating film 25 is preferably not less than 20% and not more than 90% of the larger thickness. That is, the difference between the second thickness T2 and the first thickness T1 is preferably not less than 20% and not more than 90% of the second thickness T2, and the difference between the fourth thickness T4 and the third thickness T3 is preferably not less than 20% and not more than 90% of the fourth thickness T4. In the case where the difference in the thickness of the coating film 25 is less than 20%, a noticeable effect is not seen as compared with the case where the film thickness is uniform. In the case where the difference in the thickness of the coating film 25 is more than 90%, cost for manufacturing such a coating film 25 tends to increase sharply.

The difference in the thickness of the coating film 25 is preferably not less than 1 μm and not more than 30 μm. That is, the difference between the second thickness T2 and the first thickness T1 is preferably not less than 1 μm and not more than 30 μm, and the difference between the fourth thickness T4 and the third thickness T3 is preferably not less than 1 μm and not more than 30 μm. By having such differences in thickness, it is possible to improve the sharpness of the cutting edge 20 or 120 in combination with the small cross-sectional shape in the portion in which the coating film 25 is thin. On the other hand, the portion in which the coating film 25 is thick becomes resistant to wear, and it is possible to increase the life of the cutting tool 1 or 100. In the case where the difference in the thickness of the coating film 25 is less than 1 μm, a noticeable effect is not seen as compared with the case where the film thickness is uniform. In the case where the difference in the thickness of the coating film 25 is more than 30 μm, cost for manufacturing such a coating film 25 tends to increase sharply.

The size of the honing surface 21 of the cutting tool 1 or 100 preferably increases correspondingly to an increase in the thickness of the coating film 25. That is, in the case where the first thickness T1 of the cutting tool 1 is smaller than the second thickness T2, in the honing surface 21 of the first cutting edge 20a, the side of the first corner cutting edge 20b is preferably smaller than the side of the second corner cutting edge 20c. In the case where the third thickness T3 of the cutting tool 100 is smaller than the fourth thickness T4, in the honing surface 21 of the third cutting edge 120a, the side of the third corner cutting edge 120b is preferably smaller than the side of the fourth corner cutting edge 120c.

The cross-sectional shape of the honing surface 21 is not limited to the substantially arc shape. For example, it is also possible to use a substantially straight shape, a combination shape in which at least one straight line and at least one arc are combined, a combination shape in which a plurality of arcs are combined, and a substantially oblong shape. Note that, when the cutting tool 1 or 100 is used in parting or grooving, the substantially arc shape is preferable. When the substantially arc shape is used, the radius of curvature thereof is preferably not less than 0.001 mm and not more than 0.1 mm. A difference between the maximum value and the minimum value of the radius of curvature is preferably not less than 0.003 mm and more than 0.1 mm. When these numerical value ranges are used, it is possible to provide the cutting tool 1 or 100 having high quality of the machined surface of the portion to be separated and capable of preventing abnormal damage such as chipping to the cutting edge 20 or 120.

The embodiments of the present invention have been described thus far, and the cutting tool of the present invention can be variously modified. For example, each of the above-described embodiments describes the shape suitable for parting and grooving, but the shape is not limited thereto. The cutting tool of the present invention can be used as cutting tools having various modes such as a cutting tool used in post-grinding in which one of cutting edges protrudes and the other cutting edge retracts.

The cutting tool of the present invention is not limited to the cutting tool having the mode that uses the cutting insert. The cutting tool of the present invention can also be used as a cutting tool having a mode that brazes a chip. In addition, the cutting tool of the present invention is not limited to a turning tool, and the cutting tool of the present invention can also be used as cutting tools having other modes such as a rotating tool and a boring tool.

In the above-described embodiments, the present invention has been described specifically in a given way, but the present invention is not limited to the above-described embodiments. It should be appreciated that various alterations and changes can be made to the present invention without departing from the gist and scope of the invention defined in the claims. The present invention encompasses all kinds of modifications, applications and equivalents that are encompassed by the idea of the present invention defined by the scope of the claims.

What is claimed is:
1. A cutting tool (1) comprising:
an end surface (10);
a peripheral side surface (12) intersecting the end surface (10); and a cutting edge in an intersecting ridgeline portion between the end surface (10) and the peripheral side surface (12), wherein when first and second points (A and B) are set on the cutting edge (20), the first point (A) protrudes further toward an outer side of the cutting tool (1) than the second point (B), the cutting tool (1) further comprising:

a coating film on a surface of the cutting tool, wherein the cutting edge (20) has a portion in which a thickness of the coating film (25) gradually increases toward the second point (B) from the first point (A).

2. The cutting tool according to claim 1, wherein
when the thickness of the coating film (25) at the first point (A) is a first thickness (T1) and the thickness of the coating film (25) at the second point (B) is a second thickness (T2), a difference between the second thickness (T2) and the first thickness (T1) is not less than 20% and not more than 90% of the second thickness (T2).

3. The cutting tool according to claim 1, wherein
when the thickness of the coating film (25) at the first point (A) is a first thickness (T1) and the thickness of the coating film (25) at the second point (B) is a second thickness, a difference between the second thickness (T2) and the first thickness (T1) is not less than 1 μm and not more than 30 μm.

4. The cutting tool according to claim 1, wherein
the cutting edge (20) has a honing surface (21), and
the honing surface (21) has a portion in which a width gradually increases toward the second point (B) from the first point (A).

5. The cutting tool according to claim 4, wherein a cross-sectional shape of the honing surface (21) is a substantially arc shape.

6. The cutting tool according to claim 1, wherein the cutting edge (20) has a portion in which a radius of curvature of a cross-sectional shape gradually increases toward the second point (B) from the first point (A).

7. The cutting tool according to claim 6, wherein a difference between a maximum value and a minimum value of the radius of curvature of the cross-sectional shape of the cutting edge is not less than 0.003 mm and not more than 0.1 mm.

8. The cutting tool according to claim 1, wherein the cutting tool (1) is a cutting insert for parting and grooving.

9. A cutting tool comprising:
an upper surface having a longitudinal direction and a lateral direction perpendicular to the longitudinal direction;
a lower surface facing a direction opposite to the upper surface, the lower surface having the longitudinal direction and the lateral direction;
a first side surface connected to the upper surface and the lower surface, the first side surface facing the longitudinal direction;
a second side surface connected to the upper surface, the lower surface, and the first side surface, the second side surface facing the lateral direction;
a third side surface connected to the upper surface, the lower surface, and the second side surface, the third side surface facing the longitudinal direction;
a fourth side surface connected to the upper surface, the lower surface, the third side surface, and the first side surface, the fourth side surface facing the lateral direction; and
a cutting edge formed in a connection portion between the upper surface and the first side surface, the cutting edge inclined relative to the second side surface and the fourth side surface such that a distance from a straight line that passes through the second side surface and the fourth side surface and is parallel to the lateral direction increases gradually toward the fourth side surface from the second side surface in a top view in which the cutting edge is viewed from a direction facing the upper surface, the cutting edge having a coating layer formed on a surface of the cutting edge, wherein
a thickness of the coating layer gradually increases from a first point closer to the fourth side surface than to the second side surface to a second point closer to the second side surface than to the fourth side surface and spaced apart from the first point by a distance corresponding to not less than half of an entire length of the cutting edge in the top view.

10. The cutting tool according to claim 9, further comprising:
a corner cutting edge connected to an end portion of the cutting edge on a side of the fourth side surface, the corner cutting edge formed into an arc shape in the top view, wherein
a thickness of a coating layer formed in the corner cutting edge is smaller than the thickness of the coating layer at the second point.

11. The cutting tool according to claim 9, further comprising:
a second corner cutting edge connected to an end portion of the cutting edge on a side of the second side surface, the second corner cutting edge formed into an arc shape in the top view, wherein
a thickness of a coating layer formed in the second corner cutting edge is larger than the thickness of the coating layer at the second point.

12. The cutting tool according to claim 9, wherein
the cutting edge includes a base material that has the coating layer formed on a surface of the base material and is formed of a sintered body, and
the base material has an edge at the first point and has a honing surface at the second point.

* * * * *